April 26, 1966  R. A. HANSON  3,247,922
SUPPORT APPARATUS FOR SURFACING EQUIPMENT
Filed July 13, 1964  5 Sheets-Sheet 1

INVENTOR.
RAYMOND A. HANSON
BY
ATTYS.

April 26, 1966   R. A. HANSON   3,247,922
SUPPORT APPARATUS FOR SURFACING EQUIPMENT
Filed July 13, 1964   5 Sheets-Sheet 2

Fig. 2

INVENTOR.
RAYMOND A. HANSON
BY
*Wells & St.John*
ATTYS.

April 26, 1966    R. A. HANSON    3,247,922
SUPPORT APPARATUS FOR SURFACING EQUIPMENT
Filed July 13, 1964    5 Sheets-Sheet 4

INVENTOR.
RAYMOND A. HANSON
BY
ATTYS.

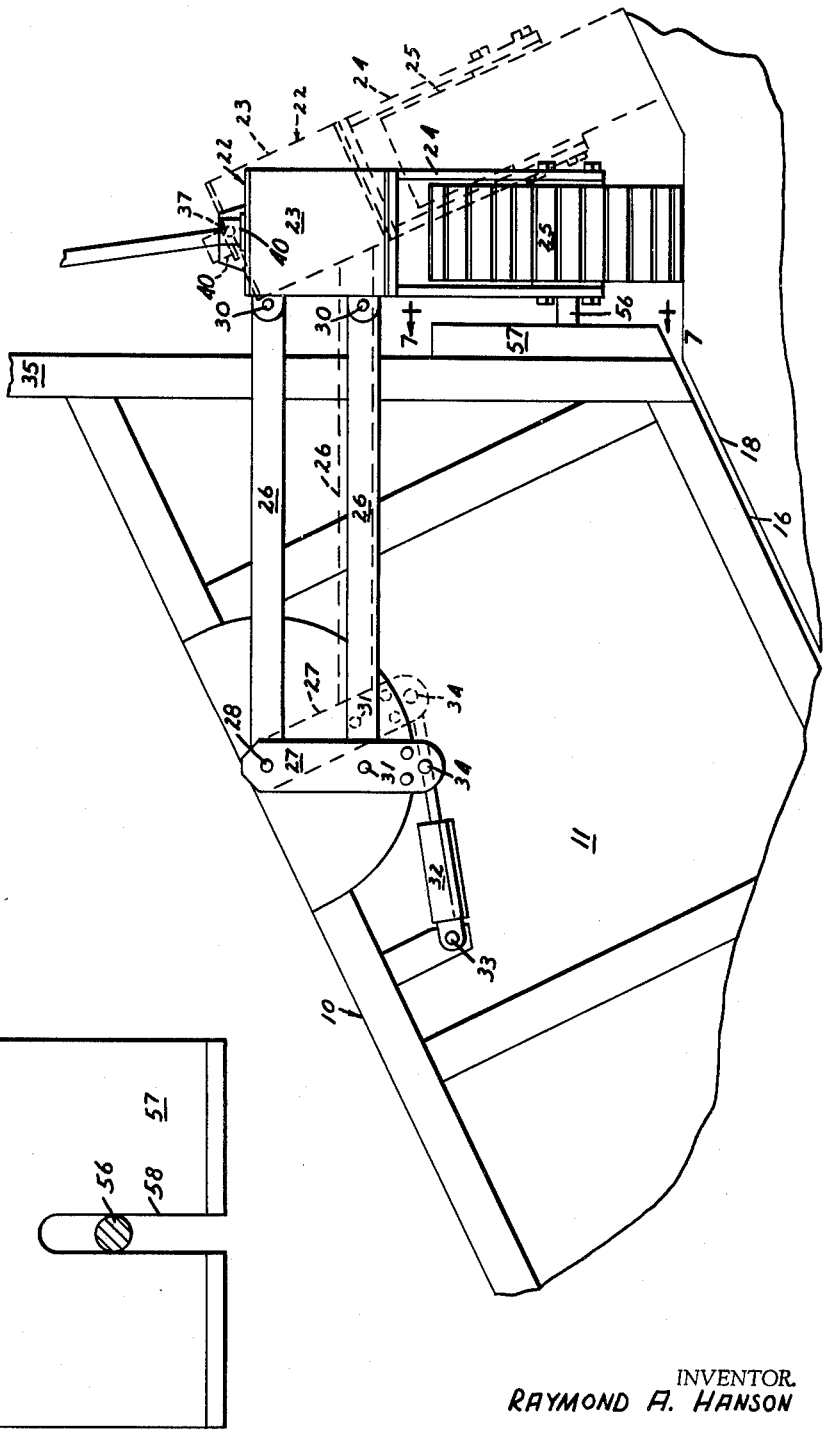

United States Patent Office 3,247,922
Patented Apr. 26, 1966

3,247,922
SUPPORT APPARATUS FOR SURFACING EQUIPMENT
Raymond A. Hanson, % R. A. Hanson Co., Palouse, Wash.
Filed July 13, 1964, Ser. No. 382,170
9 Claims. (Cl. 180—9.52)

This invention relates to a novel supporting apparatus for self powered surfacing equipment, particularly equipment designed to act upon the sloped surface of earth ditches such as those formed along the length of a canal. The particular equipment supported might be earth moving equipment, earth working equipment, concrete lining equipment or other types of surfacing equipment.

The present invention is concerned with the supporting of surface working equipment for canal machinery or other types of machinery that work along a sloping surface. The apparatus provides elevational control of the equipment relative to the surface, and also provides an adjustable end thrust that can be exerted in opposition to the thrust on the equipment due to the slope, as well as a means for operating the device so as to allow it to travel along a horizontal surface where necessary. The apparatus also provides means for selectively moving the equipment parallel to its length, which normally extends transversely across the slope being worked.

It is a first object of this invention to provide a rather simple mechanical supporting apparatus for carrying equipment along the length of a sloped surface during operations on that surface. The equipment is designed to provide elevational control of the equipment relative to the slope surface, which might be manually or automatically controlled under varying circumstances.

Another object of this invention is to provide a mechanical supporting apparatus that can combat the end thrust exerted downwardly on a machine operating transversely along the length of a sloped surface. This is accomplished by angular adjustment of the ground engaging tracks or other mechanisms relative to the supported equipment and framework.

Another object of this invention is to provide, where necessary, a simple direct mechanical coupling between the ground engaging driving apparatus and the main transverse framework of the machine. When so utilized, the supporting apparatus itself is not relied upon to transmit driving thrust to the machine framework. This is essential under conditions where the thrust encountered is too great to be accommodated by the support apparatus.

Another object of this invention is to provide a rather simple apparatus by which the ground engaging devices can be turned 90 degrees so that the machine can travel along a horizontal surface parallel to its length. Such travel is oriented 90 degrees from the normal travel of the machine along a slope in a transverse position.

These and further objects will be evident from the following disclosure, taken together with the accompanying drawings, which illustrate one preferred form of the invention. It is to be understood that this form of the invention is only exemplary, and might be modified in specific detail under particular circumstances.

In the drawings:

FIGURE 2 is a top view of the apparatus shown in FIGURE 1, the alternate positions of the crawler tracks being illustrated in dashed lines;

FIGURE 6 is an enlarged view of the upper track assembly and adjacent framework, portions of the framework being broken away and an alternate position of the track assembly being shown in dashed lines; and FIGURE 7 is an enlarged fragmentary sectional view of the thrust plate and pin as seen along line 7—7 in FIGURE 6.

Figure 1:
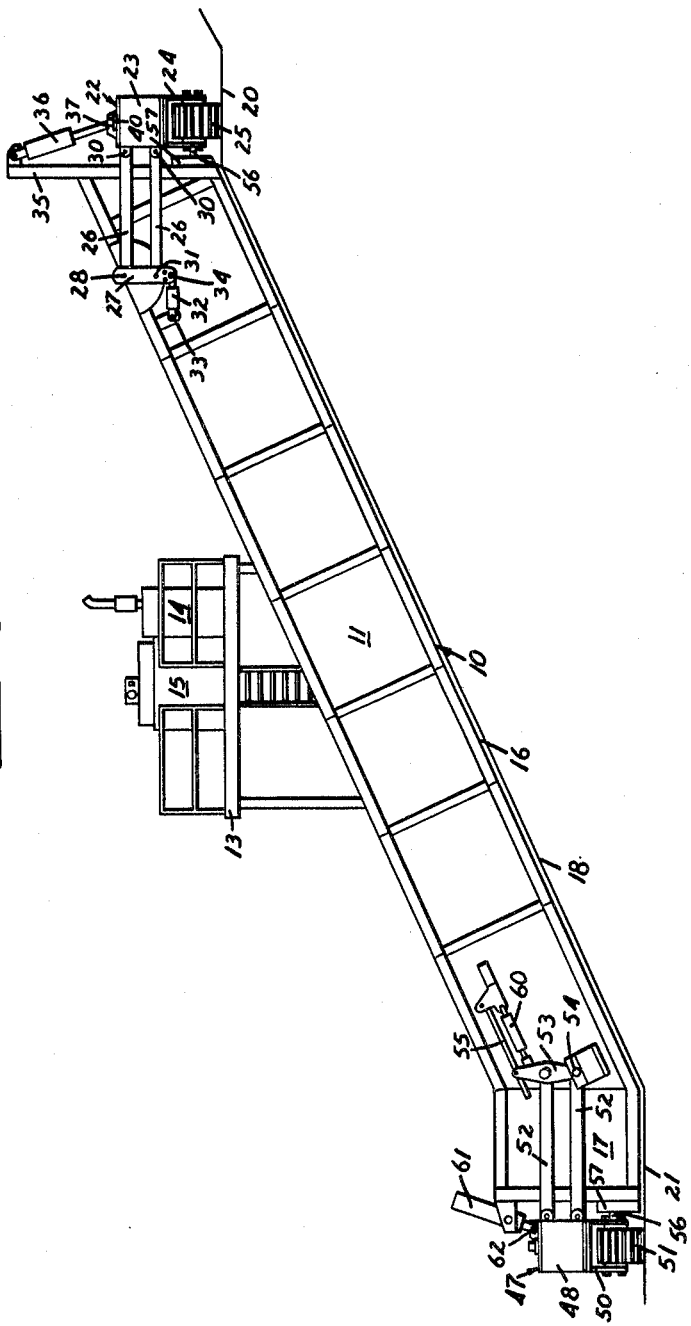
FIGURE 1 is an elevation view of the apparatus shown in its normal operating condition relative to a slope being serviced.

The present invention is concerned with the supporting and driving arrangement for a self driven surfacing machine of the type utilized in the surfacing operations required during the preparation of a sloped surface such as that along the side of a lined canal. The machine itself is not shown in detail, and could be any desired type of machine, such as a slip form for concrete lining, or an excavating type of machine, or a surface trimming machine. The details of the machine itself are not of consequence in this particular description, it being understood in each instance that the necessary surfacing equipment will be carried on the framework that will be described.

As shown in the drawings, the framework 10 extends normally transverse across the sloped surface during the surfacing operations which it is designed to perform. The framework 10 includes an upright front side 11 and a rear side 12 that extend along the sloped surface and partly along the horizontal bottom surface. The framework 10 is a rigid supporting frame structure designed to carry the necessary equipment and machinery for the desired surface operations.

Figure 4:
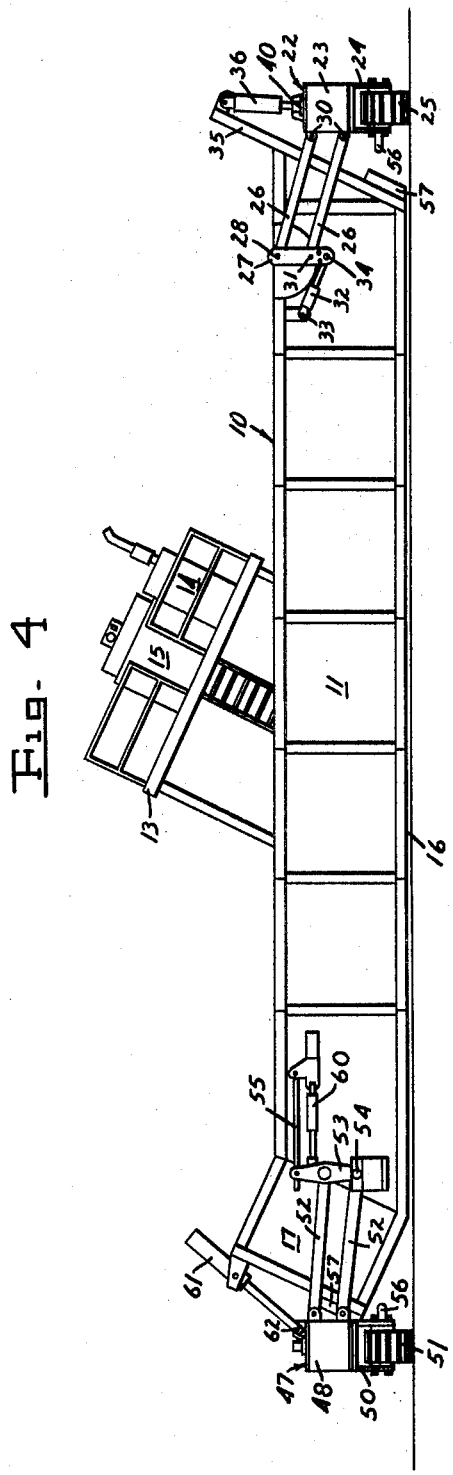
FIGURE 4 is a view similar to FIGURE 1, but illustrating the apparatus during travel on a horizontal surface, prior to turning of the tracks.

Mounted on the framework 10 is a typical control platform 13 for the operator of the machine. The platform 13 might also support a motor 14 for the mechanical equipment and a typical control panel 15. While the platform 13 is shown at the center of this framework 10, it might be at either end thereof or at any other convenient location. The platform 13 would probably be designed in most instances so as to best accommodate the operator during the surfacing operation in the orientation shown in FIGURE 1. However, it must also be capable of providing the required support for the operator when the machine is temporarily located on a horizontal surface as shown in FIGURE 4, although this need not be the most convenient position of the two.

In a typical installation, the framework 10 includes a bottom edge 16 along the front side 11 that is complementary to the sloping surface 18 on which the machine is operating. At the lower end of the machine is shown an angular portion 17 that extends partially along the lower horizontal surface designated in the drawings by the numeral 21. At the upper end of the sloping surface 18 is a top horizontal ledge 20.

The framework 10 is supported during normal operation on the two horizontal surfaces 20 and 21. The framework 10 is self-supporting by means of the ground engaging carving devices that will be described below. These devices and the support apparatus with which this description is concerned provide angular and elevational adjustment of the framework 10 relative to the surface on which it is being supported.

Figure 3:
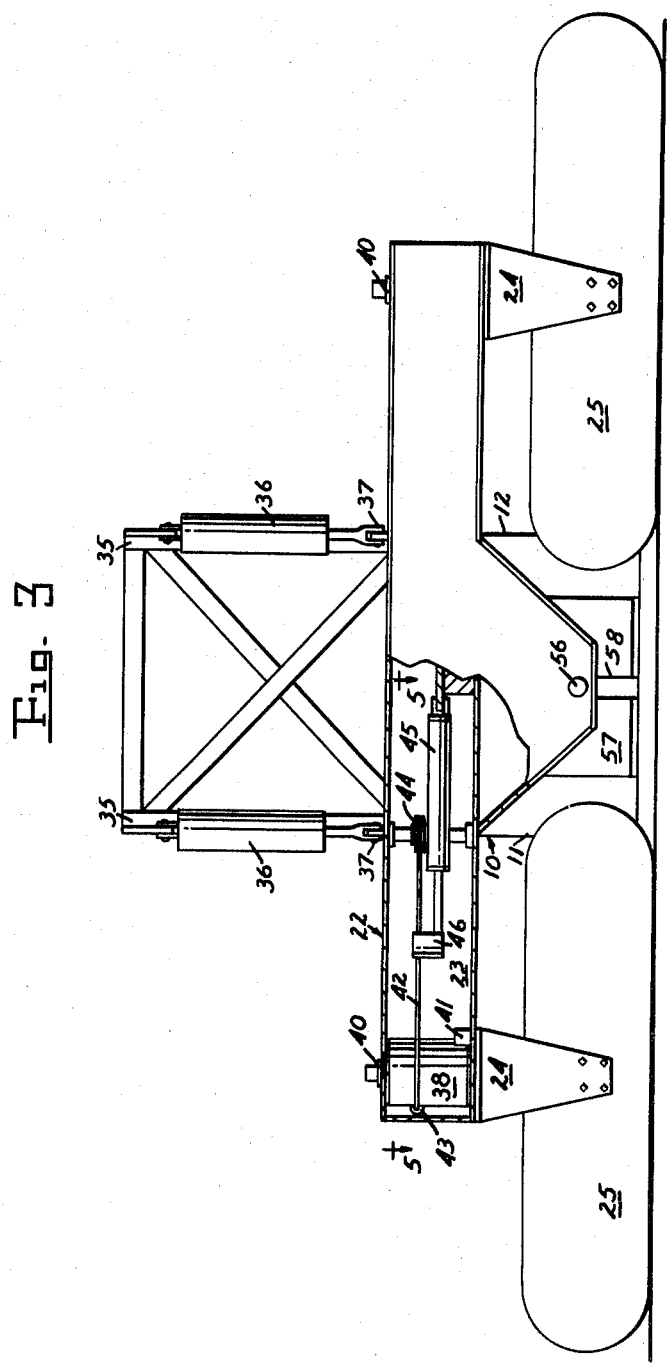
FIGURE 3 is an enlarged end view of the apparatus shown in FIGURE 1, taken from the right hand end thereof.

At the upper end of the machine as shown in FIGURE 1, and seen in better detail in FIGURE 3, is an upper track assembly 22. The track assembly 22 basically comprises a frame 23 from which is supported individual track carriages 24 for the front and rear track devices 25. The track devices 25 are conventional in structure and are not shown in detail in the drawings. They are preferably individually driven by hydraulic motors or other conventional driving devices.

The frame 23 is supported on the framework 10 by front and rear sets of parallelogram arms 26 that extend outwardly from the framework 10. The parallelogram arms 26 are pivoted at their inner ends to crank arms 27 at both the front and rear sides of the framework 10. The crank arms 27 are respectively pivoted relative to the framework 10 about a common axis denoted by the numeral 28.

The frame 23 is pivoted to the parallelogram arms 26 about pivot pins 30 parallel to the common axis 28. As seen in the drawings, the lower arm 26 of each pair is pivoted to the crank arm 27 about a pivot denoted as 31, while the upper arm 26 is pivoted about the common pivot axis 28. A hydraulic cylinder 32 is pivoted at 33 to the framework 10 and has a piston rod pivoted at 34 to the crank arm 27 of the respective parallelogram assembly.

At the upper end of the machine is provided a pair of upstanding posts 35 which support the upper ends of two hydraulic cylinders 36. Cylinders 36 extend to a pivotal connection at 37 located on the frame 23. The cylinders 36 operate in unison to vary the elevation of the frame 23 relative to the framework 10 and thereby adjust the elevation of the framework 10 relative to the sloped surface 18. The cylinders 32 operate in unison to angularly adjust the position of the frame 23 relative to the framework 10, being movable from the position shown in FIGURE 1 to the position shown in FIGURE 4 so as to accommodate both the sloped surface and a horizontal surface.

Figure 5:
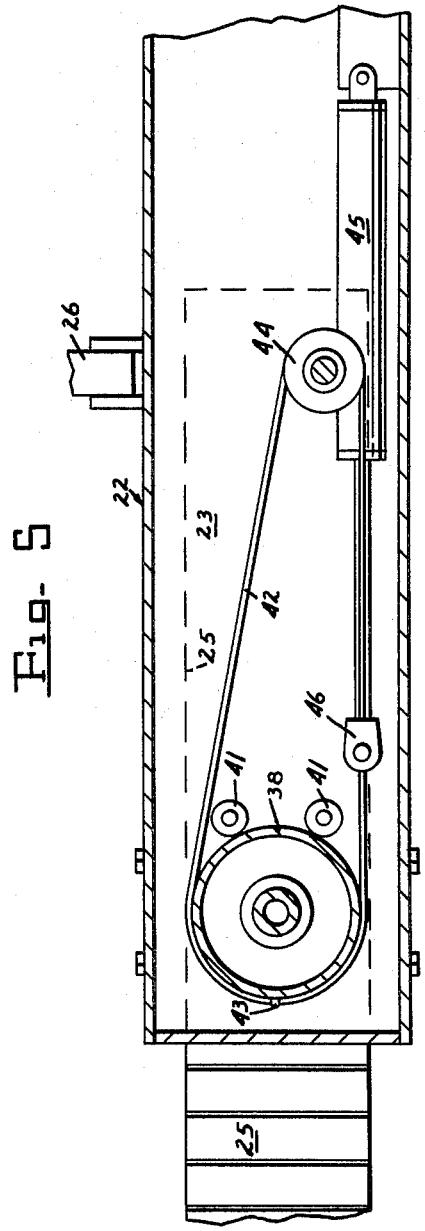
FIGURE 5 is an enlarged fragmentary sectional view taken along line 5—5 in FIGURE 3.

In order to allow the framework 10 to be moved along a horizontal surface parallel to its length, rather than in its normal transverse position, there is provided the apparatus illustrated in FIGURES 3 and 5 that is capable of turning the respective track devices 25. Basically, this comprises individual upright cylindrical drums 38 fixed to the respective track carriages 24 and rotatably mounted on the frame 23 by means of a top bearing 40 and lower guiding rolls 41 against which the drum 38 rests. The drum 38 is pulled into engagement with the rolls 41 by means of a cable 42 that extends about its periphery and which is anchored to the drum 38 at a connection designated by the numeral 43. The cable 42 also extends about the periphery of an idler pulley 44 rotatably mounted on the frame 23.

Cable 42 is turned by means of a cylinder assembly 45 pivoted and anchored at one end to the frame 23 and having a rod connection 46 coupled to the cable 42. Thus, extension or contraction of the cylinder assembly 45 will cause the drum 38 and the respective track device 25 to be turned a maximum of 90 degrees. This turning device is not designed with sufficient strength to normally turn the tracks 25 while carrying the load of the framework 10, but by means of the parallelogram arms 26, and the cylinders 36, the framework 10 can rest upon the ground surface after being adjusted to the position shown in FIGURE 4, the tracks 25 can be lifted from ground engagement, and the tracks can then be turned 90 degrees and lowered again to bear the weight of framework 10 for movement parallel to its length.

The lower track assembly 47 shown in the drawings is basically the same as the upper track assembly 22 previously described. It includes a frame 48 and two track carriages 50 that carry track devices 51. Again, the frame 48 is supported by front and rear pairs of parallelogram arms 52 connected at their inner ends to a pair of crank arms 53 at the front and rear sides of the machine. The crank arms 53 are pivotally mounted about a common axis 54 for angular adjustment relative to the framework 10. At the lower end of the machine there is also provided a guide rod 55 parallel to the operating cylinder 60. The purpose of the guide rod 55 is to provide an adjustable stop so that the rotation of the crank arm 53 can be fixed or limited as might be desired during a surfacing operation. This is particularly important in counteracting the downward thrust that developes in a machine operating along a sloped surface of this type. The very weight of the machine itself causes the thrust to be directed toward the lower track assembly 47. This can be counteracted by varying the angular relation of the frame 48 relative to the framework 10, so that an opposite upward thrust is produced against the framework 10. The guide rod 55 can be provided with movable stops such as adjustable nuts or pins so as to more positively provide a mechanical limit to the movement of the cylinder 60.

The lower track assembly 47 is elevationally controlled by means of cylinders 61 pivoted to the framework 10 at 62 and pivoted to the frame 48 in the manner described relative to the corresponding cylinders 36 for the upper track assembly 22. Again, the cylinders 60, provide the necessary angular adjustment of the frame 48 relative to the framework 10, while the cylinders 61 provide the required elevational control, the cylinders being capable of moving the track assembly 47 from the positions shown in FIGURE 1 to the positions shown in FIGURE 4.

The fully adjustable track supporting assemblies previously described are not always sufficiently strong to accommodate the thrust required in the framework 10 as it travels along the sloped surface 18 during a normal surfacing operation. While not required in some instances, such as in the case of slip forms, it is esesntial to provide a direct mechanical connection between the frame 23 and 48 and the framework 10 when carrying machines such as trimming equipment or other earth engaging devices. This can be readily accomplished in the manner shown in detail in FIGURES 3, 6, and 7. The simple structure utilized is an inwardly directed solid pin 56 that is fixed to the inside surface of the frame 23 or 48. The pin 56 is designed to be received within a slot 58 cut in a plate 57 fixed at each end of the framework 10. The pin 56 will be engaged within the complementary slot 58 only when the respective track assemblies 22 and 47 are located both parallel and adjacent to the respective ends of the framework 10 as shown in FIGURE 1. When moved to their alternative positions for carrying of the framework 10 along a horizontal surface, the pins 56 will automatically disengage, having slipped out of the vertical slots 58. In this manner, a direct mechanical connection is provded at a low position relative to the tracks 25 or 51 for more efficient transmission of driving power from the tracks to the framework 10.

Many different changes could be made in the present device without deviating from the basic concept with which it is concerned. The machine is generally designed to provide a flexible supporting apparatus for sloped surfacing equipment. It is not restricted to any particular type of equipment, and can be used for applying surface materials, grading or trimming equipment, or even for excavation purposes.

The apparatus is particularly useful where the surfacing equipment must be brought down the slope periodically in order to clear obstructions such as bridges. In such a case, the normal operating position of the machine would be as shown in FIGURE 1. Automatic or manual controls could be utilized to vary the elevation of the bottom edge 16 on the framework 10 relative to the sloped surface 18. This control would be accomplished by operation of the cylinders 36 and 61. Also, an upward thrust can be directed on the machine by variation in the position of the lower cylinders 61 to adjust the position of the crank arms 53 relative to the framework 10. When it is necessary to bring the machine down the slope, the upper track devices 25 would overrun the lower track devices 51 and carry the framework 10 to the lower horizontal surface shown as 63 in FIGURE 4. After reaching the surface 64, the track assemblies 22 and 47 would be in the positions shown in FIGURE 4. The track assemblies 22 and 47 must then be elevated by operation of the cylinders 36 and 61 and the track devices 25 and 51 must then be turned 90 degrees to the position shown in dashed lines in FIGURE 2. This is accomplished by operation of the cylinder assemblies 45 as previously disclosed. The framework 10 can then again be supported by operation of the cylinders 36 and 61, and be moved in a direction parallel to its length. This structure provides mobility to the rather cumbersome slope machine, and is particularly important in instances where the length of the slope is such that movement of the framework 10 by a crane or other external device is impractical. The apparatus just disclosed makes the placement and control of the machine entirely under the control of the machine operator who can travel with it on the platform 13.

Having thus described my invention, I claim:

1. A support apparatus for the structural framework of a surfacing machine for sloped surfaces wherein the framework normally extends across the slope surface in an orientation perpendicular to its intended direction of movement, comprising:
 first and second ground engaging driving assemblies mounted at the respective ends of the framework;
 parallelogram arm assemblies pivoted respectively to said driving assemblies and to said framework to provide elevational adjustment of said drive assemblies relative to said framework;
 a movable pivot in each parallelogram arm assembly to provide angular adjustment of said drive assemblies relative to said framework;
 first power means operatively connected between said framework and each driving assembly to position said driving assemblies elevationally;
 and second power means operatively connected between said framework and each movable pivot to position said driving assemblies elevationally.

2. A support apparatus as defined in claim 1 wherein each of said driving assemblies includes front and rear ground engaging elements independently carried on a frame supported by said parallelogram arm assemblies, said ground engaging elements being mounted on said frames for motion relative thereto about upright axes;
 and third power means operatively connected between said frames and said ground engaging elements to angularly position the latter about their respective axes.

3. A support apparatus as defined in claim 1 further including a releasable direct mechanical connection between each drive assembly and the framework for the transmittal of thrust in the intended direction of movement of the framework during surfacing operations.

4. A support apparatus for the structural framework of a surfacing machine for sloped surfaces, comprising:
 a supporting framework for surfacing apparatus adapted to traverse the length of the slope during surfacing operations;
 a ground engaging driving assembly located at one transverse end of the framework;
 a pair of crank arms pivotally mounted at the front and rear sides of said framework about a common axis parallel to the intended direction of travel of said framework during surfacing operations;
 a plurality of parallel support arms pivoted at one end to said crank arms and at their remaining ends to said driving assembly, the pivotal connections of said support arms being about axes respectively parallel to said common axis;
 first power means on said framework operatively connected to said crank arms adapted to locate said crank arms about said common axis;
 and second power means on said framework operatively connected to said driving assembly adapted to elevationally locate said driving assembly relative to said framework.

5. In a support apparatus for slope surfacing equipment:
 a supporting framework for surfacing apparatus adapted to traverse the length of the slope during surfacing operations;
 a ground engaging driving assembly located at one transverse end of the framework;
 front and rear vertical parallelogram support linkages connected between the framework and the driving assembly for movement about axes parallel to the intended direction of motion of said framework;
 and means included in said support linkages for varying the angular relation of the driving assembly relative to the framework about one of said axes;
 said front and rear parallelogram support linkages each comprising:
  a plurality of parallel support arms respectively pivoted about said axes at their outer ends to said driving assembly;
  a crank member pivoted about said one axis to said framework, the remaining end of each support arm being pivoted to said crank member about said axes;
  and a hydraulic cylinder assembly pivotally connected between said framework and said crank member for angular adjustment of said crank member about said one axis.

6. In a support apparatus for slope surfacing equipment:
 a supporting framework for surfacing apparatus adapted to traverse the length of the slope during surfacing operations;
 a ground engaging driving assembly located at one transverse end of the framework;
 front and rear vertical parallelogram support linkages connected between the framework and the driving assembly for movement about axes parallel to the intended direction of motion of said framework;
 means included in said support linkages for varying the angular relation of the driving assembly relative to the framework about one of said axes;
 hydraulic cylinder means pivotally connected between said framework and said parallelogram support linkages for angular adjustment of said parallelogram support linkages relative to said framework.

7. In a support apparatus for slope surfacing equipment:
 a supporting framework for surfacing apparatus adapted to traverse the length of the slope during surfacing operations;
 a ground engaging driving assembly located at one transverse end of the framework;
 front and rear vertical parallelogram support linkages connected between the framework and the driving assembly for movement about axes parallel to the intended direction of motion of said framework;
 and means included in said support linkages for varying the angular relation of the driving assembly relative to the framework about one of said axes;
 said driving assembly comprising:
  front and rear ground engaging elements independently mounted on a support frame carried by said parallelogram linkages, said ground engaging elements being mounted on said frame for motion relative thereto about upright axes and powered means connected between said frame and each of said ground engaging elements to angularly position the latter about their respective axes.

8. In a support apparatus for slope surfacing equipment:
 a supporting framework for surfacing apparatus adapted to traverse the length of the slope during surfacing operations;

a ground engaging driving assembly located at one transverse end of the framework;

front and rear vertical parallelogram support linkages connected between the framework and the driving assembly for movement about axes parallel to the intended direction of motion of said framework;

and means included in said support linkages for varying the angular relation of the driving assembly relative to the framework about one of said axes;

said driving assembly comprising:

front and rear ground engaging elements independently mounted on a support frame carried by said parallelogram linkages, said ground engaging elements being mounted on said frame for motion relative thereto about upright axes;

a horizontal drum fixed to each ground engaging element and being located above the respective ground engaging element coaxial with the axis thereof relative to said frame;

a cable fixed to said drum;

and a hydraulic cylinder pivotally connected to said frame and cable to thereby move said cable so as to angularly position said drum about its axis.

9. In a support apparatus for slope surfacing equipment:

a supporting framework for surfacing apparatus adapted to traverse the length of the slope during surfacing operations;

a ground engaging driving assembly located at one transverse end of the framework;

front and rear vertical parallelogram support linkages connected beween the framework and the driving assembly for movement about axes parallel to the intended direction of motion of said framework;

means included in said support linkages for varying the angular relation of the driving assembly relative to the framework about one of said axes;

a rigid pin fixedly mounted on said driving assembly and protruding outwardly therefrom in a direction toward said framework;

and a rigid plate mounted on said framework at said one end thereof having an upright slot formed therein adapted to selectively receive said pin.

References Cited by the Examiner

UNITED STATES PATENTS

| | | | |
|---|---|---|---|
| 2,090,959 | 8/1937 | Jackson | 61—63 |
| 2,216,930 | 10/1940 | Altemus | 280—112 X |
| 3,095,938 | 7/1963 | Bertelsen | 180—9.52 X |
| 3,160,221 | 12/1964 | Boone | 180—41 |

BENJAMIN HERSH, *Primary Examiner.*

R. J. JOHNSON, *Assistant Examiner.*